United States Patent
Morris (10) Patent No.: US 9,529,929 B1
(45) Date of Patent: Dec. 27, 2016

(54) SYSTEMS, APPARATUS, METHODS OF OPERATION THEREOF, PROGRAM PRODUCTS THEREOF AND METHODS FOR WEB PAGE ORGANIZATION

(76) Inventor: Mitchell Joseph Aiosa Morris, Purchase, NY (US)

( * ) Notice: Subject to any disclaimer, the term of this patent is extended or adjusted under 35 U.S.C. 154(b) by 976 days.

(21) Appl. No.: 10/271,265

(22) Filed: Oct. 15, 2002

(51) Int. Cl.
*G06F 3/00* (2006.01)
*G06F 17/30* (2006.01)

(52) U.S. Cl.
CPC ..... *G06F 17/3089* (2013.01); *G06F 17/30905* (2013.01)

(58) Field of Classification Search
CPC ............... G06F 17/3089; G06F 17/30905
USPC ............ 715/513, 501.1, 536, 517, 523, 530, 234, 715/243, 254
See application file for complete search history.

(56) References Cited

U.S. PATENT DOCUMENTS

| | | | |
|---|---|---|---|
| 6,148,311 A * | 11/2000 | Wishnie et al. | 715/513 |
| 6,574,634 B2 * | 6/2003 | Woehl | 707/102 |
| 2003/0036865 A1 * | 2/2003 | Zhuo et al. | 702/81 |
| 2003/0149564 A1 * | 8/2003 | Gong et al. | 704/246 |
| 2003/0225853 A1 * | 12/2003 | Wang et al. | 709/217 |

* cited by examiner

*Primary Examiner* — Kyle Stork (57) ABSTRACT

Systems, apparatus, methods of operation thereof, program products thereof and methods for web site organization, which comprises a plurality of web pages having common content. The system can be comprised of a plurality of web pages having common content and one or more web pages that do not have common content. Each of the plurality of web pages comprising common content can have non-common content, that is content, which is not common to each of the plurality of web pages having common content. There is a common content memory location for storing the common content. There is at least one non-common content memory location for storing the non-common content. The common content comprises an insertion location. The system comprises a generator of each of the particular web pages comprising common and non-common content. The generator comprises a web site location identifier, a parameter and an inserter or insert means at the insert location. The parameter identifies the particular non-common content storage location to generate a particular web page comprising common and non-common content. The generator inserts the particular non-common content into the common content permitting the system to display a web page corresponding to a combination of the common content and the non-common content. This system permits modification of many web pages through modifying only one memory location, that is the one corresponding to the common content, when the modification relates to the common content.

24 Claims, 6 Drawing Sheets

SYSTEMS, APPARATUS, METHODS OF OPERATION THEREOF, PROGRAM PRODUCTS THEREOF AND METHODS FOR WEB PAGE ORGANIZATION

FIELD OF THE INVENTION

The present invention is directed to systems, apparatus, methods of operation thereof, program products thereof and methods of web page organization

BACKGROUND

Web sites are locations accessed on the Internet. A web site is typically composed of a large number of web pages which are linked together. Generally one of the web pages corresponding to a web site is a home page, which provides information which leads to web pages associated with the web site, such web pages are referred to as associated web pages herein. The term web pages as used herein includes the home page and associated web pages. The web pages are stored on a server connected to the Internet. The web site is accessed by going to the URL associated with the web site.

Each web page has a corresponding document stored on the server which results in the display on a computer terminal, display device, etc. of the web page associated with the stored document. The stored document is typically in HTML language, but can be any other language suitable for displaying a web page. Unless indicated to the contrary, the term HTML document will be understood to generically refer to a document in any language that can be used to display a web page. Generally, there is one HTML document for each web page of the web site. Generally a web site is made up of web pages that have a consistent format which makes it apparent that they belong together, that is, there are many common features between the web pages. In general, web sites can be made up of groups of web pages wherein the web pages within each group, referred to herein as associated web pages, have more common elements than with web pages from another group within the web site. A typical constant element between associated web pages is a menu that is common to each web page. The menu, for example, could be a simple list of all associated web pages, which permits direct movement from any one web page of the group to any other web page of the group, to a web page outside of the group of the web site, or to another web site. Since many and possibly all web pages contain these common elements and since there is a document for each web page, a lot of storage space is taken up with repeated code. Moreover, if a change is desired in this menu or other common element, it has to be made in every HTML document that contains this common element which results in a lot of wasted time making changes to the identical code in each web page. It is tedious to change each document in the same way and uses time which could be used more productively.

One solution to this problem is to use the utility server side include, which permits embedding in a document a command or series of commands, which, for example, can be a function call or series of function calls. This embedded command can permit different operations to be performed, such as, for example, to run a program, to move to another page or a another file can be included in a displayed web wage by going to that other document and displaying it. This function call is static and not dynamically changeable by a user displaying a web page. When a web page with such a function call is run to display the web page, the system will look for and find the referenced file and display it in the appropriate place in the displayed web page. Therefore, a menu or other element which is common to a group of web pages can be stored in a separate file. Thus server side include can be used for elements of a group of web pages that are common between the web pages which can be updated, such as to modify the common menu or other common element. Thus using server side include a set of documents, each of which, for example, has the same menu, can display the menu using server side include by making a type of function call. If the menu is stored in file MENU.TXT, the document that is being displayed contains a command that instructs the server to insert the MENU.TXT file at the appropriate spot in a displayed webpage when it is called as an HTML command. This way the menu can be inserted in every displayed web page that contains it. The server side include is a fixed command in the file that contains it. If there are many server side includes calls, the system gets bogged down and runs more slowly and can run very slowly if there are a very large number of server side include function calls. This occurs because the file that is being displayed does not contain all the HTML code needed to display the web page. Rather than making one request many file requests are made, which slows down the system to a level below what is desirable. To get the web page to be displayed as quickly as possible, all the HTML code is preferably part of the document being displayed. Using server side include still requires that there is a lot of repeated code for that part of the document that is not related to the menu. This is because server side include is static and not dynamically changeable by the user displaying the web page. Using server side include each web page with a common portion, such as a menu, must have a file associated with it which contains the function call to the menu file. The present invention avoids these problems.

SUMMARY OF THE INVENTION

A broad aspect of the present invention is a system for web site organization, which comprises a plurality of web pages having common content. The system can be comprised of a plurality of web pages having common content and one or more web pages that do not have common content. Each of the plurality of web pages comprising common content can have non-common content, that is content, which is not common to each of the plurality of web pages having common content. There is a common content memory location for storing the common content. There is at least one non-common content memory location for storing the non-common content. The common content comprises an insertion location. The system comprises a generator of each of the particular web pages comprising common and non-common content. The generator comprises a web site location identifier, a parameter and preferable an inserter or insert means at the insert location. The parameter is preferable selectable by a user accessing the web page and identifies the particular non-common content storage location to generate a particular web page comprising common and non-common content. The generator combines or merges the common content and the non-common content. The generator preferably inserts the particular non-common content into the common content permitting the system to display a web page corresponding to a combination of the common content and the non-common content. The system permits modification of many web pages through modifying only one memory location, that is the one corresponding to the common content, when the modification relates to the common content. Also, the HTML file used to generate a displayed page contains all the data to display the web page.

Another broad aspect of the present invention is a method for web site organization, which comprises providing a plurality of web pages having common content. The method can be comprised of providing a plurality of web pages having common content and one or more web pages that do not have common content. Each of the plurality of web pages comprising common content can have non-common content, that is content, which is not common to each of the plurality of web pages having common content. There is a common content memory location for storing the common content. There is at least one non-common content memory location for storing the non-common content. The common content comprises an insertion location. The method comprises generating each of the particular web pages comprising common and non-common content. The generating comprises providing a web site location identifier, a parameter and providing for insertion at the insert location. The parameter identifies the particular non-common content storage location to generate a particular web page comprising common and non-common content. The generating combines or merges the common content and the non-common content. The generating preferably inserts the particular non-common content into the common content permitting displaying a web page corresponding to a combination of the common content and the non-common content. This method permits modification of many web pages through modifying only one memory location, that is the one corresponding to the common content, when the modification relates to the common content.

Another broad aspect of the present invention is a program product comprising a machine readable media storing the systems and methods of the present invention.

BRIEF DESCRIPTION OF THE DRAWING

These and other features, objects, and advantages of the present invention will become apparent upon consideration of the following detailed description of the invention when read in conjunction with the drawing in which.

DETAILED DESCRIPTION

Figure 1:
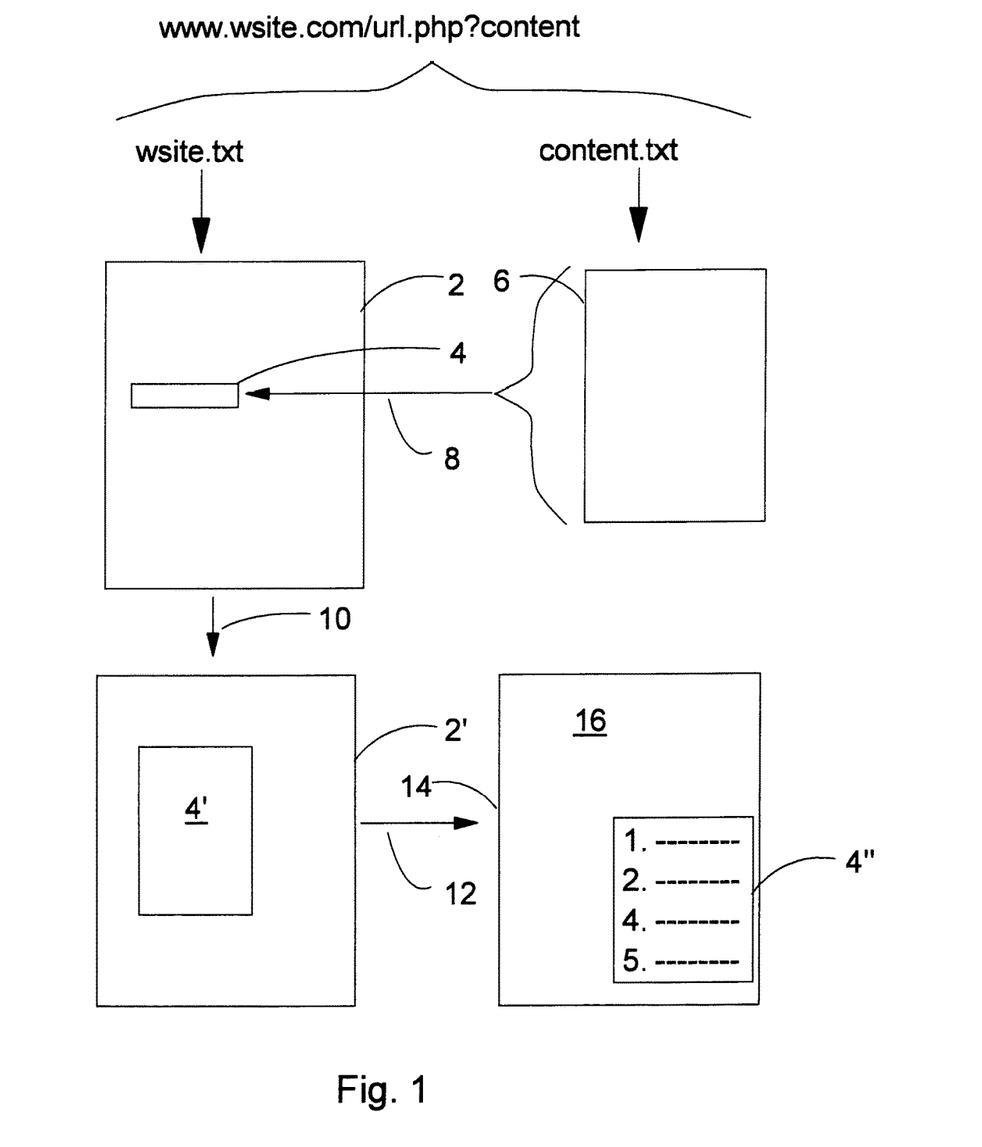
FIG. 1 is a schematic view of an exemplary embodiment of the present invention wherein common content are stored in different files that can be combined.
Figure 2:
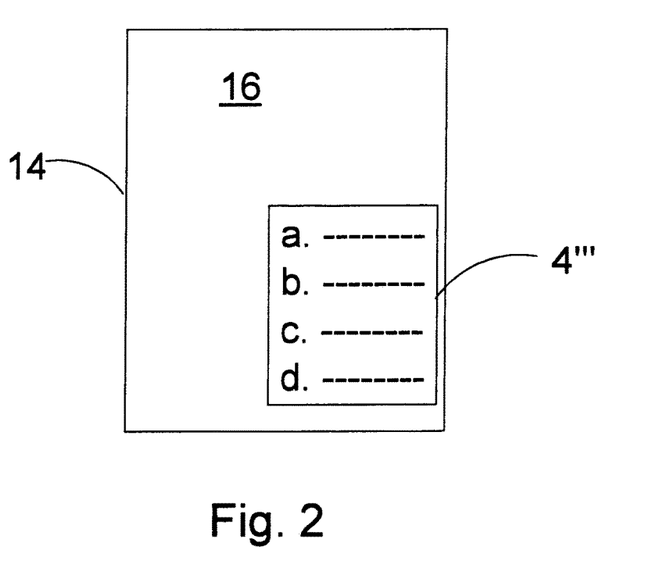
FIG. 2 schematically shows an alternative exemplary embodiment of a displayed web page according to the present invention.

FIG. 1 is a schematic view of an exemplary embodiment of the present invention. When there is more than one web page corresponding to the web site and when all of the web pages of a web site have generally similar appearance only a small number of HTML files are needed to display any one of those web pages. In a preferred embodiment two web pages are used, one for the index page to the web site and one for all other pages. Thus all web pages that have similar appearance are displayed using only one HTML file. There may be different variations depending on how many different thing can be done on the web site. When a web page is called, a parameter (at least one parameter or a plurality of parameters) is passed to it by the system, which from the common content file and the non-common content file, generates a composite file of the common content and the non-common content by preferably inserting the non-common content into the common content at an insert location in the common content as described herein. For example, a web site, which is ordinarily reached by entering the URL www.wsite.com is called by including a parameter, for example, www.wsite.com/url.php?content. The term after the "?", here "content", is a parameter. The system, for example will look for a file corresponding to the parameter "content", which for example could be the HTML file "content.txt". When the URL www.wsite.com/url.php?content is called on the Internet, the server corresponding to www.wsite.com where this web site is located is found. This server has stored in memory an HTML file, which could for example, be wsite.txt shown as 2 in FIG. 1, which displays the content common to all of the web pages corresponding to www.wsite.com. Additional text 6 which contains content that is different between each of the web pages of the web site could, for example, be called "content.txt". "Content.txt" is stored at a memory location, preferably on the server. The file "wsite.txt" has a location 4 therein which uses the parameter "content" whereby the system preferably inserts in the file "wsite.txt" the contents of the file "content.txt". By this procedure a composite file 2', which contains the data of the files "wsite.txt" and "content.txt", is created, which is preferable stored in a temporary memory location and by which is displayed one of the web pages 16 corresponding to www.wsite.com. As described above if server side include is used, a composite file is not created using a parameter. Server side include does not use a parameter, which is variable and thus dynamic, and which can be selected by a user accessing the particular web page. The server side include command or function call is fixed. If the server side include function call, to a non-common content file, is in the common content file, when the common content file is executed to display a web page the combined content of the common content and non-common content file are displayed. This requires multiple files containing the common content. In a preferred embodiment of applicant's invention there is only one file of the common content which is combined with a non-common content file when a web page is displayed by use of a variable parameter as described herein. Thus according to applicant's invention, in particular according to a preferred embodiment when changes are to be made to the common content, one file is to be modified, even though many different displayed web pages contain this common content. Since server side include does not use a variable parameter it is not useful in this manner. There can be any number of files of the type "content.txt", which, for example, could be named "contentN.txt" where "N" can be any integer, thereby providing for any number of files, such as, for example "content9.txt", "content125.txt", etc., that can preferably be inserted at location 4 of file 2 to generate any number of web pages. Preferably the content file names are suggestive of the content that is displayed when that particular content file is used to generate a web page. For example, to display news about the web site the parameter could be "news"; to display a product list the parameter could be "products"; to display financial information the parameter could be "financial"; to display human resource information the parameter could be "HR"; etc. FIG. 1 schematically shows the displayed results of a "content.txt" file as a list of numbered lined of text, and FIG. 2 schematically shows the displayed results of a "content.txt" file as a list of lines identified by letters. Although FIGS. 1 and 2 show the non-common displayed content as different types of lists, the non-common displayed content is not limited thereto. The non-common displayed content can be any type of content, including but not limited to text and images. Although the non-common displayed content is shown in FIGS. 1 and 2 in the same location on the displayed web page 14, the non-common displayed content can be at any location on the displayed web pages, preferably where the common content is not displayed. The location of the displayed content is determined by the HTML code in the composite file 2'. In fact the content of a "content.txt" file can alter the displayed location of content that is common to more than one web page of the web site.

Figure 3:
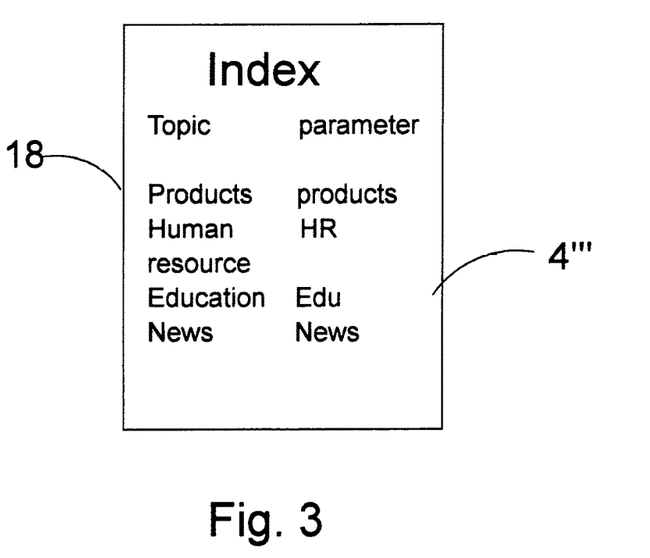
FIG. 3 schematically shows a displayed index web page showing the parameters corresponding to the various web pages.

The list of parameters to display the various web pages of the web site can be listed on one of the web pages of the web site, such as, for example "index", "parameter", "list" etc., which can display a web page with the parameter list such as schematically shown in FIG. 3, which schematically shows displayed an index web page. The index web page shows a content list with a corresponding parameter list. The index web page is preferably displayed using "www.wsite.com/url.php?index". Each item listed on the index web page can be a conventional hot spot which when selected by moving the cursor on it an selecting for example by double clicking with a mouse or similar button results in displaying the desired web page. Alternatively, double clicking can result in inserting the corresponding parameter to display the web page as described herein. For example, in FIG. 3 if topic "Education" or parameter "Edu" is selected, the URL location identifier of the web browse is replaced with "www.wsite.com/url.php?Edu", which results in displaying the "Education" web page. The browser can also have a pull down menu which shows the parameter list, each parameter of which can be selected as described above. Alternatively, the browser could have an icon which when selected results in displaying the parameter list, each parameter of which can be selected as described above.

A web site can have more that one class of web pages that have common content. The term class is used here to designate a group of web pages of the web site that have common content. There can be more that one such group. For example, "class1" can be comprised of a group a web pages that can be generated as described above through, for example, a set or parameters "class1 parameter1" where "class1" designates the first class and "parameter1" designates the first of the parameters of class, a set of parameters "class9 parameter31" where "class9" designates the 9th class and "parameter31" designates the thirty first of the parameters of "class9", and a general set of parameters "classN parameterM" where "classN" designates the Nth class and "parameterM" designates the Mth parameters of "classN". When there is more than one class of web pages there is an HTML file for each class, such as for example "wsite.classN.txt" which contains the HTML data to generate the displayed content that is common to the Nth class.

Figure 4:
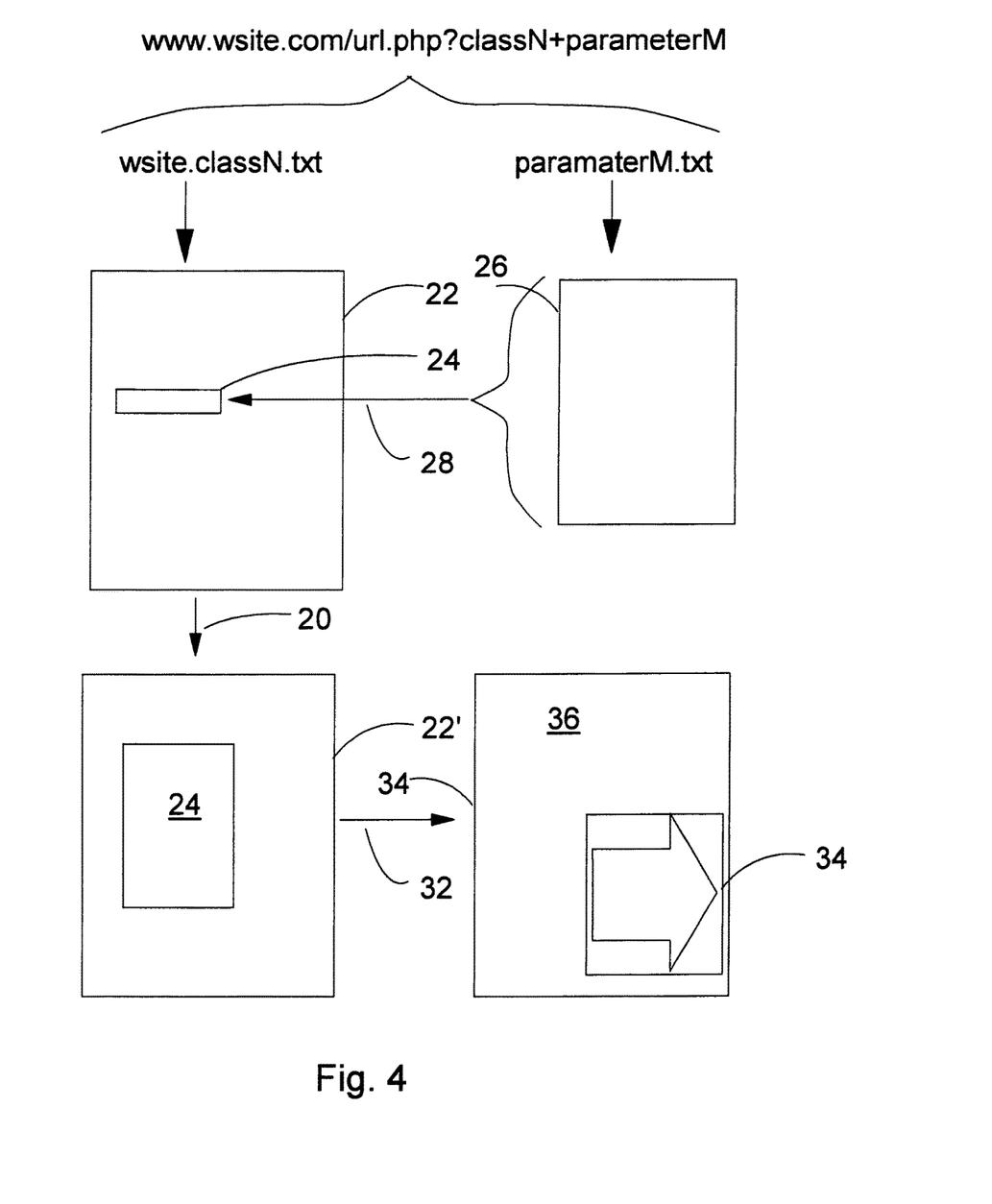
FIG. 4 schematically shows the same type of configuration as in FIG. 1, but for a more general case.

FIG. 4 schematically shows the same type of figure as in FIG. 1, but for this general case. When there is more than one class, if a change is desired in the common parts of that class, it is only necessary to edit one HTML file, that is the one corresponding to the common elements of that class.

In FIG. 4 when the URL www.wsite.com/url.php?classN+parameterM is called on the Internet, the server corresponding to www.wsite.com, where this web site is located, is found. This server has stored in memory an HTML file, which could for example, be wsite.classN.txt 22, which displays the content common to all of the web pages corresponding to classN of www.wsite.com. Additional content 26 which contains content that is different between each of the web pages of classN of the web site could, for example, be called "classNparameterM.text", which is stored at a memory location, preferably on the server. The file "wsite.classN.txt" preferably has a location 4 therein which uses the parameter "classN+parameterM" whereby the system inserts in the file "wsiteclassN.txt" the contents of the file "classNparameterM.txt". By this procedure a composite file 22', which contains the data of the files wsite.classN.txt and classNparameterM.txt, is created, which is preferably stored in a temporary server memory location and by which is displayed one of the web pages 36 corresponding to www.wsite.com. In FIG. 4 the content of "classNparameterM.txt" is shown schematically displayed as an image 34. There can be any number of files "classNparametrM.txt", for which, for example, "N" and "M" can be any integers or other designation, thereby providing for any number of files, such as, for example "class8parametr98.txt", "class1parametr101.txt", etc., that can be inserted at location 4 of file 22 to generate any number of web pages. The non-common content of one class can be the same as the non-common content of another class. In such a situation the HTML file containing the data need not be identified by a class name, such as "classNparametrM", but could have a generic name, such as "classparametrM" and is for example intended to explain an example of the present invention. The manner of naming files herein is exemplary only and not limiting. Any file naming technique or procedure can be used.

Figure 5:
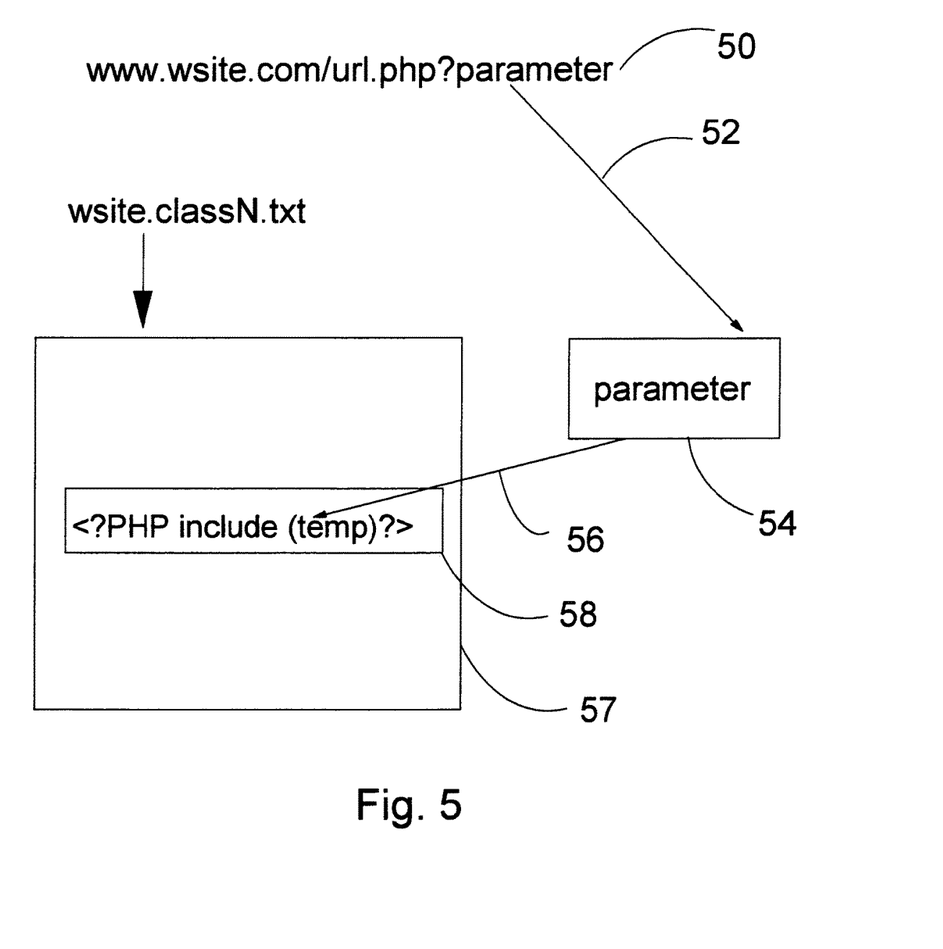
FIG. 5 schematically shows an example of inputting a parameter to the system to combines files according to the present invention.

The present invention permits accessing web pages through a URL, call. Parameters are used in Internet search engines. For example, in an Internet search engine, such as www.yahoo.com, when a search term is entered in the search field, after "www.yahoo.com?" in the URL field of the browser there appears a string of terms, which are parameters that are being passed to a program that is running on the server. The program uses the parameters to conduct the search of stored files to find URL locations that contain the specified parameters. The URL locations found as a result of the search are listed on a displayed web page. The user can select from the list to go to the selected URL location. According to the present invention, the supplied parameters are used to find a file stored on the server and to preferably insert the content of that file into another file as described above. For example, location 4 of file 2 of FIG. 1 or location 24 of file 22 of FIG. 4 is the location where the non-common content is preferably inserted into the file containing the web page common content or elements. At these insertion locations there is a code which provides the means for resulting in the insertion of the contents of the inserted file. For example, as stated above, in FIG. 4 when the URL www.wsite.com/url.php?classN+parameterM is called on the Internet, at location 24 there is preferably inserted the content of file "classNparameterM.txt". This can be accomplished in a number of ways. For example, at location 24 there can be the following PHP command <?PHP include (temp)?>. When the URL www.wsite.com/url.php?classN+parameterM is executed, the parameters "classN" and "parameterM" are placed by the system into one or more environment variables (EVs). When PHP command <?PHP include(temp)?> is read by the system, the system replaces the variable term "temp" with the contents of the environment variables to result in the PHP command <?PHP include (classN+parameterM)?> which looks for the file "classNparameterM.txt" to insert into the file wsite.classN.txt to display the web page schematically shown in FIG. 4 as displayed web page 34. For another example, at location 24 there can be the following CGI command <!-- #cgi -exec temp -->. This executes a CGI command of name temp which inherits the environment variables from the file that is called. The CGI function gets the file and displays it. When this CGI command is read by the system, the system replaces the variable name "temp" environment variables to result in the CGI command <!-- #cgi> which looks for the file "classNparameterM.txt" to insert into the file wsite.classN.txt to display the web page schematically shown in FIG. 4 as displayed web page 34. FIG. 5 schematically shows this process. At 50 www.wsite.com/url.php?parameter is entered at the destination location in the web browser. The server where the web site wsite.com is located recognizes the parameter and places the parameter in a storage location 54 as indicated by arrow 52. The file wsite.com on the server has at location 58 an insertion command or insertion means command, such as <?PHP include (temp)?>, as indicated above. The system gives the temporary parameter "temp" the value of the storage location 54 as indicated by arrows 56. Such temporary storage can be any type of storage, such as magnetic storage, semiconductor memory, disc drive memory, RAM, DRAM, etc. Insertion command 56 causes the system to search for a file and insert its contents preferably at location 56 to result in a composite file for display as a web page with common and non-common content or elements as described above.

Figure 6:
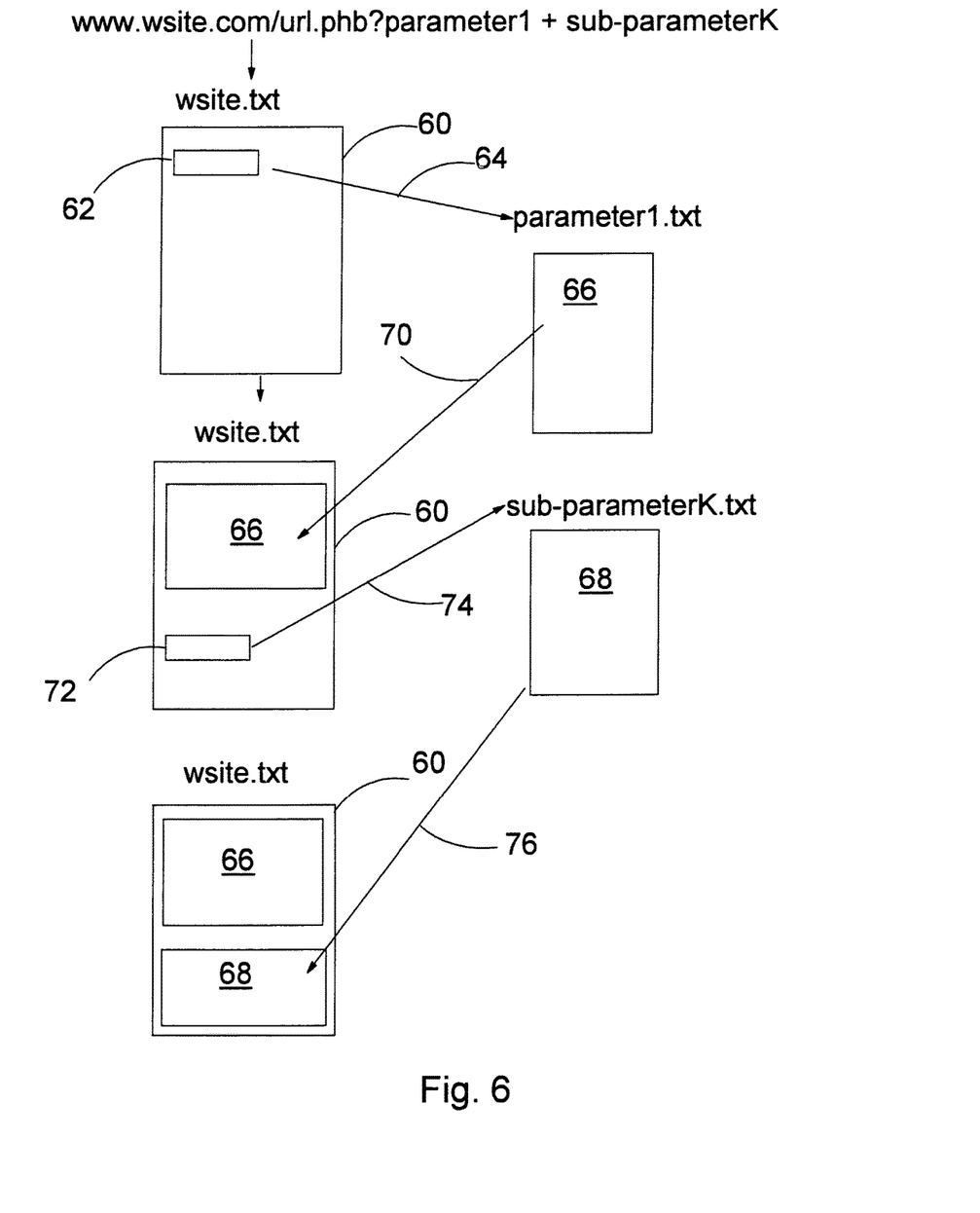
FIG. 6 schematically shows a technique for creating a hierarchy of common content.

FIG. 6 schematically shows a hierarchy of inserters or insertion means such as 58 of FIG. 5 by which a web site can be organized to have a hierarchy of web pages with a hierarchy of common content or elements. In FIG. 6 www.wsite.com/url.php?parameter1+sub-parameter2 is entered in the browser location field to locate the server where the web site wsite.com resides. The server reads the parameters "parameter1" and "parameter2" and stores them in parameter storage locations as described above. The file wsite.txt contains content or elements common to a set of web pages. At insert location 62 there is an inserter or insert means as described above which finds the storage location as indicated by arrow 64 corresponding to "parameter1", which is shown as file "parameter1.txt" 66. The inserter or insert means results in the file "parameter1.txt" 66 being inserted as described above in the file "wsite.txt" as indicated by arrow 70 and preferably stored in a temporary storage location as described herein. File "wsite.txt" has another insert location 72 at which there is an inserter or insert means as described above, which finds the storage location as indicated by arrow 74 corresponding to "sub-parameterK", which is shown as file "sub-parameterK.txt" 68. The inserter results in the file "sub-parameterK.txt" 68 being inserted as described above in the file "wsite.txt" as indicated by arrow 76. Preferably as described above file 60 with inserts 66 and 68 are stored in a temporary storage location, which the system uses to display a web page composed of the composite file. There can be any number of insertion points in the file "wsite.txt", each permitting any file to be inserted in the file "wsite.txt". This permits creating hierarchy of common content. For example, the file "wsite.txt" may contain common content to a group of web pages. The file "wsite.txt" with the contents of file "parameter1.txt" inserted therein may provide common content for a subgroup of web pages (the 1 in "parameter1" can be any number or anything else so that there can be any number such parameters and thus any number of sub-common content). The combined files ("wsite.txt" and "parameter1") can have any number of files "sub-parameterK.txt" (K can have any value) inserted therein. Thus the combined files ("wsite.txt" and "parameter1") form the comment content of the combination thereof with "sub-parameterK". There can be any number of insertion points in the file "wsite.txt". Thus groupings of the content of "wsite.txt" and the content of any grouping of the inserted content can form a common content for web pages formed from this common content and the content of other files. This type of embedding can be to any degree or order of embedding. For example there can be many insertion points in file 60 such as 62 and 72.

Figure 7:
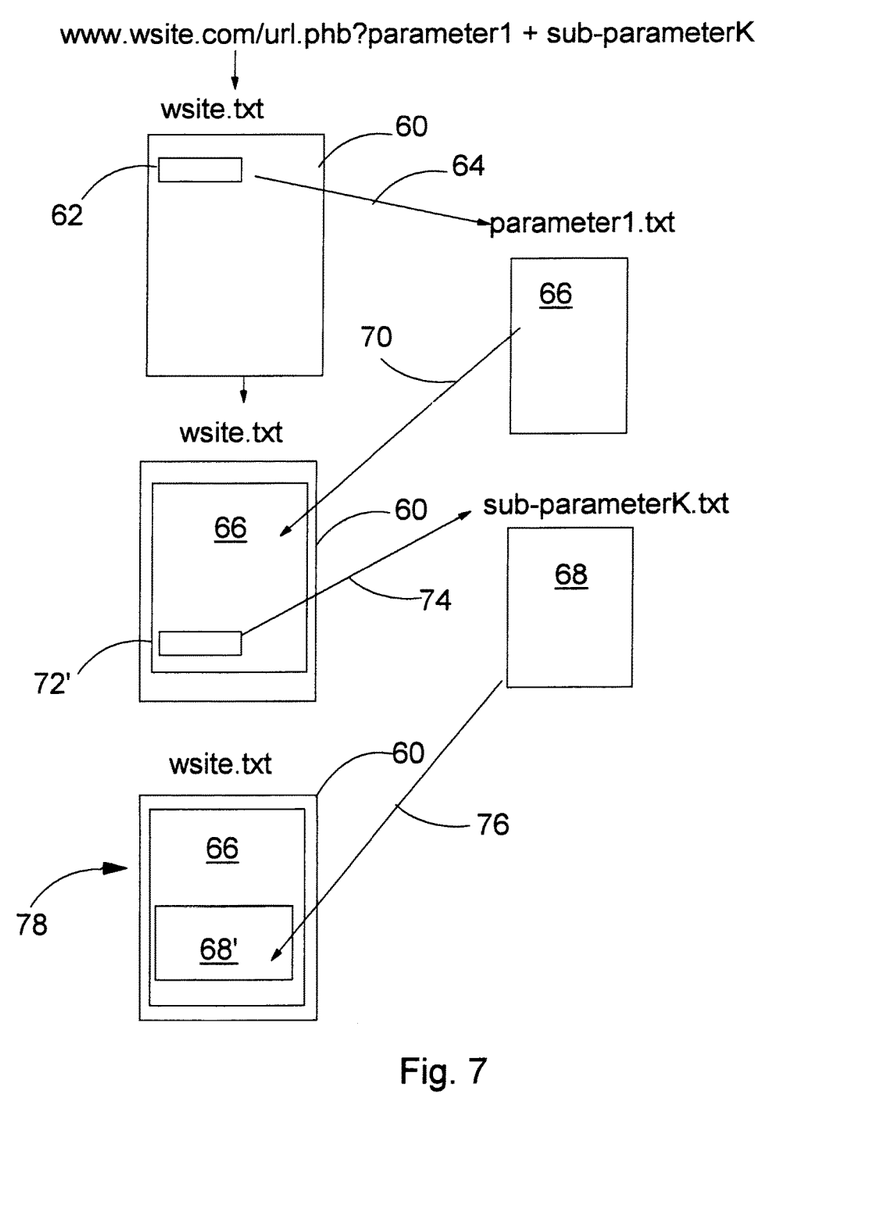
FIG. 7 schematically shows another technique for creating a hierarchy of common content.

FIG. 7 schematically shows a hierarchy of inserters or insertion means such as 58 of FIG. 5 by which a web site can be organized to have a hierarchy of web pages with a hierarchy of common elements. Elements of FIG. 7 are the same as those of FIG. 6 except that inserter or insert means 72 is replaced by 72' which rather than being in file "wsite.txt" 60, as shown in FIG. 6, is in the file "parameter1.txt" 66, which is the file inserted into "wsite.txt". This results in the file "sub-parameterK.txt" being inserted into content the file "parameter1.txt" in the combination of files "wsite.txt", "parameter1.txt" and "sub-parameterK.txt" show as 78 in FIG. 6. Another insertion point can be in file "parameterK.txt". There can be any number of insertion points embedded in a file which are embedded in other files. Thus the first file in the hierarchy, here "wsite.txt", is the common content for all combinations of files that are embedded there in as shown in FIG. 7. Thus the combination of the first file and the second file, here "parameter1.txt" forms the common content for the all other files embedded therein, here the third file "sub-parameterK.txt", as shown in FIG. 7. The combination of the first, second and third files, (wsite.txt, parameter1.txt and sub-parameterK.txt) forms the common content for a fourth group of files, which can be embedded in this combination in the manner as shown in FIG. 7. This type of embedding can be to any degree or order of embedding. For example there can be many files of the type files 66 with insertion points such as 72' inserted into a file such as file 60.

The techniques for combining files as shown in FIGS. 4, 6, and 7 can be combined in any ways, for example the techniques of FIGS. 4, 6 and 7 can be combined in the following combinations where FN represents the technique of Fig. N (that is for example F4 represents the technique of FIG. 4): F4+F6+F7; F4+F6; F4+F7, and F6+F7. This is exemplary only and not limiting. Each of these techniques alone and in any combination or subcombination has the advantage of avoiding repeated content in files which substantially simplifies modification of the common content that is displayed in web pages as described above.

The system and method described herein can be stored, for example as a program product, on storage media such as a disc, tape, semiconductor memory, paper or any other media, which can be machine read and loaded into a computer device on which it can run. Such a storage product, which stores the system or method as a program product or a machine readable media, comprises the system and methods described herein.

Although the present invention has described in terms of the on-common content being inserted into the common content, this is exemplary only and not limiting. Alternatively, the common content can be inserted into the non-common content. Generally the common and non-common content are combined or merged. Any way of combining the common content and the non-common content is suitable for the present invention.

Examples

1. A system for organizing a web site, the web site comprising a plurality of web pages,
comprising:
each of the plurality of web pages comprising common content and non-common content, there being a plurality of non-common contents, each of the plurality of web pages comprises the common content and each of the plurality of web pages comprises at least one of the plurality of non-common contents;
a common content storage location for storing the common content;
a plurality of non-common content storage locations for storing each of the plurality of non-common contents;
a generator of each of the plurality of web pages comprising a web site location identifier and a parameter;
the parameter identifies at least one of the plurality of non-common contents;
the generator combines at least one particular one of the plurality of non-common contents with the common content forming a composite content permitting the system to display a web page corresponding to the composite content.

2. A system according to example 1 wherein the common content comprises an insertion location, and wherein the generator combines the at least one particular one of the plurality of non-common contents into the common content at the insertion location forming the composite content.

3. A system according to example 1 wherein at least one of the non-common content comprises an insertion location, and wherein the generator combines the common content into the at least one particular one of the plurality of non-common contents at the insertion location forming the composite content.

4. A system according to example 1 wherein the web site further includes web pages not containing the common content.

5. A system according to example 1 wherein at least one of the plurality of web pages comprises more than one of the plurality of non-common contents.

6. A system according example 1 further including an index web page comprising a list of the parameters for displaying each of the plurality of web pages.

7. A system according to example 6 wherein the parameters are selectable from the index web page for displaying each of the plurality of web pages.

8. A system according to example 1 wherein the common content and the non-common content is selected from the group consisting of text and images.

9. A system according to example 1 further including a plurality of classes of web pages.

10. A system according to example 9 wherein each of the plurality of classes comprises a common class content and a non-common class content.

11. A system according to example 10 wherein the non-common class content is selected from the group consisting of being the same between the plurality of classes, different between the plurality of classes and combinations thereof.

12. A system according to example 2 wherein the common content comprises a plurality of insertion locations, the non-common content is insertable at each of the plurality of insertion locations and is selected from the group consisting of the same content, different content and combinations thereof.

13. A system according to example 3 wherein the non-common content comprises a plurality of insertion locations, the common content is insertable at each of the plurality of insertion locations and is selected from the group consisting of the same content, different content and combinations thereof.

14. A system according to example 1 wherein at least one of the plurality of non-common contents comprises a non-common content insertion location.

15. A system according to example 1 further including a pull down menu listing the parameters.

16. A system according to example 2 wherein at least one of the plurality of non-common contents comprise a sub-non-common content insertion location and wherein the sub-non-common content is insertable at the sub-non-common content insertion location, the sub-non-common content is selected from the group consisting of the same content, different content and combinations thereof, and the sub-non-common content is selected from the group consisting of being the same as the non-common content being different from the non-common content.

17. A system according to example 2 wherein the common content comprises a plurality of insertion locations and wherein at least one of the plurality of non-common content comprises a sub-non-common content insertion location.

18. A system according to example 17 wherein the non-common content comprises a plurality of insertion locations.

19. A system according to example 17 wherein the non-common content is insertable at each of the plurality of insertion locations and at the sub-non-common content insertion location and is selected from the group consisting of the same content, different content and combinations thereof.

20. A system according to example 1 further including a plurality of icons corresponding to the parameters.

21. A system according to example 2 further including an inserter at the insertion location.

22. A system according to example 3 further including an inserter at the insertion location.

23. A method for organizing a web site comprising:
providing a plurality of web pages wherein each of the plurality of web pages comprises common content and non-common content, there being a plurality of non-common contents, each of the plurality of web pages comprises the common content and each of the plurality of web pages comprises at least one of the plurality of non-common contents;
storing the common content in a common content storage location;
storing each of the plurality of non-common contents in a plurality of non-common content storage locations;
generating each of the plurality of web pages using a web site location identifier and a parameter;
the parameter identifies at least one of the plurality of non-common contents;
the generating combines at least one particular one of the plurality of non-common contents with the common content forming a composite content permitting displaying a web page corresponding to the composite content.

24. A method according to example 23 further including inserting into the common content the at least one particular one of the plurality of non-common contents forming the composite content.

25. A method according to example 23 further including inserting into at least one of the non-common content the common content forming the composite content.

26. A method according to example 23 wherein the web site further includes web pages not containing the common content.

27. A method according to example 23 further including inserting more than one of the plurality of non-common contents into at least one of the plurality of web pages comprises.

28. A method according example 23 further including providing an index web page comprising a list of the parameters for displaying each of the plurality of web pages.

29. A method according to example 28 further including selecting the parameters from the index web page for displaying each of the plurality of web pages.

30. A method according to example 23 wherein the common content and the non-common content is selected from the group consisting of text and images.

31. A method according to example 23 further providing a plurality of classes of web pages.

32. A method according to example 31 wherein each of the plurality of classes comprises a common class content and a non-common class content.

33. A method according to example 32 wherein the non-common class content is selected from the group consisting of being the same between the plurality of classes, different between the plurality of classes and combinations thereof.

34. A method according to example 24 wherein the common content comprises a plurality of insertion locations, the non-common content is insertable at each of the plurality of insertion locations and is selected from the group consisting of the same content, different content and combination thereof.

35. A method according to example 25 wherein the non-common content comprises a plurality of insertion locations, the common content is insertable at each of the plurality of insertion locations and is selected from the group consisting of the same content, different content and combination thereof.

36. A method according to example 23 wherein at least one of the plurality of non-commons content comprises a non-common content insertion location.

37. A method according to example 23 further including selecting the parameter from a a pull down menu listing the parameters.

38. A method according to example 21 wherein at least one of the plurality of non-common contents comprise a sub-non-common content insertion locations and selectably inserting the non-common content at the sub-non-common content insertion location, the sub-non-common content is selected from the group consisting of the same content, different content and combinations thereof, and the sub-non-common content is selected from the group consisting of being the same as the non-common content being different from the non-common content.

39. A method according to example 24 wherein the common content comprises a plurality of insertion locations and wherein at least one of the plurality of non-common contents comprises a sub-non-common content insertion location.

40. A method according to example 39 wherein the non-common content comprises a plurality of insertion locations.

41. A system according to example 39 further including selectably inserting the non-common content at each of the plurality of insertion locations and at the sub-non-common content insertion location and wherein the non-common content is selected from the group consisting of the same content or different content.

42. A method according to example 23 further including providing a plurality of icons corresponding to the parameters.

43. A method according to example 24 wherein the inserting is at an insertion location.

44. A method according to example 25 wherein the inserting is at an insertion location.

45. An article of manufacture comprising
a computer program product comprising a computer usable medium having computer readable program code comprising a method for organizing a web site, comprising:
 providing a plurality of web pages wherein each of the plurality of web pages comprises common content and non-common content, there being a plurality of non-common contents, each of the plurality of web pages comprises the common content and each of the plurality of web pages comprises at least one of the plurality of non-common contents;
 storing the common content in a common content storage location;
 storing each of the plurality of non-common contents in a plurality of non-common content storage locations;
 generating each of the plurality of web pages using a web site location identifier and a parameter;
 the parameter identifies at least one of the plurality of non-common contents;
 the generating combines at least one particular one of the plurality of non-common contents with the common content forming a composite content permitting displaying a web page corresponding to the composite content.

46. An article of manufacture according to example 45 further including inserting into the common content the at least one particular one of the plurality of non-common contents forming the composite content.

47. An article of manufacture according to example 45 further including inserting into the non-common content location the common content forming the composite content.

48. An article of manufacture according to example 45 wherein the web site further includes web pages not containing the common content.

49. An article of manufacture according to example 45 wherein at least one of the plurality of web pages comprises more than one of the plurality of non-common contents.

50. An article of manufacture according example 45 further including providing an index web page comprising a list of the parameters for displaying each of the plurality of web pages.

51. An article of manufacture according to example 49 further including selecting the parameters from the index web page for displaying each of the plurality of web pages.

52. An article of manufacture according to example 45 wherein the common content and the non-common content is selected from the group consisting of text and images.

53. An article of manufacture according to example 45 further including providing a plurality of classes of web pages.

54. An article of manufacture according to example 53 wherein each of the plurality of classes comprises a common class content and anon-common class content.

55. An article of manufacture method according to example 54 wherein the non-common class content is selected from the group consisting of being the same between the plurality of classes, different between the plurality of classes and combinations thereof.

56. An article of manufacture method according to example 48 wherein the common content comprises a plurality of insertion locations, the non-common content is insertable at each of the plurality of insertion locations and is selected from the group consisting of the same content, different content and combinations thereof.

57. An article of manufacture method according to example 49 wherein the non-common content comprises a plurality of insertion locations, the common content is insertable at each of the plurality of insertion locations and is selected from the group consisting of the same content, different content and combinations thereof.

58. An article of manufacture according to example 47 wherein at least one of the plurality of non-commons content comprises a non-common content insertion location.

59. An article of manufacture according to example 47 further including selecting the parameter from a pull down menu listing the parameters.

60. An article of manufacture according to example 47 wherein at least one of the plurality of non-common contents comprise a sub-non-common content insertion locations and selectably inserting the sub-non-common content at the sub-non-common content insertion location, the non-common content is selected from the group consisting of the same content, different content and combinations thereof and the sub-non-common content is selected from the group consisting of being the same as the non-common content being different from the non-common content.

61. An article of manufacture according to example 46 wherein the common content comprises plurality of insertion locations and wherein at least one of the plurality of non-common contents comprises a sub-non-common content insertion location.

62. An article of manufacture according to example 63 wherein the non-common content comprises a plurality of insertion locations.

63. An article of manufacture according to example 62 further including selectably inserting the non-common content at each of the plurality of insertion locations and at the sub-non-common content insertion location and wherein the non-common content is selected from the group consisting of the same content, different content and combinations thereof.

64. An article of manufacture method according to example 45 further including providing a plurality of icons corresponding to the parameters.

65. An article of manufacture according to example 46 wherein the inserting is at an insertion location.

66. An article of manufacture according to example 47 wherein the inserting is at an insertion location.

These examples are exemplary only. Any combinations of these examples are within the scope of the present inventions as well as any variations thereof.

Examples 1-66 which are method examples can be system or apparatus examples by replacing the method steps with the language means for performing the method steps. Examples 1-66 which are system or apparatus examples can be method examples by replacing the means for doing to the corresponding method step. All examples can be combined in any combination and with any other teaching herein. Examples 1-66 which are method examples can be memory media examples for controlling a computer wherein the memory media comprises means for performing the method steps of the method examples. Examples 1-66 which are apparatus examples can be memory media examples for controlling a computer wherein the memory media comprises means for performing the functions of the apparatus examples. Examples 1-66 which are method examples can be computer program stored on a computer readable media examples wherein the computer program product comprises instruction means for performing the method steps of the method examples. Examples 1-66 which are apparatus examples can be memory media examples for controlling a computer wherein the memory media comprises the means for performing the functions of the apparatus examples or method steps corresponding to the means of the apparatus examples. Examples 1-66 which are method examples can be a program device readable by a machine examples, tangible embodying a program of instructions executable by the machine to perform the method steps of the method examples. Examples 1-66 which are apparatus examples can be a program device readable by a machine examples, tangible embodying a program of instructions executable by the machine to perform the method steps corresponding to the means of the apparatus examples or comprising the means of the apparatus. In all storage media examples method steps can be written as means for performing the method steps and all means for performing functions can be written as method steps.

While there has been described and illustrated methods, articles or manufacture and apparatus for implementing the inventions, it will be apparent to those skilled in the art that modifications and variations are possible without deviating from the broad scope of the invention which shall be limited solely by the scope of the claims appended hereto. The teachings of all references cited herein are incorporated herein by reference.

Having thus described our invention, what is claimed as new and desire to secure by Letters Patent is:

1. A system for organizing a web site, said web site comprising a plurality
   of web pages, comprising:
   each of said plurality of web pages comprising common content and non-common content, there being a plurality of non-common contents, each of said plurality of web pages comprises said common content and each of said plurality of web pages comprises at least one of said plurality of non-common contents;
   a common content storage location for storing said common content in a common content file;
   a plurality of non-common content storage locations for storing each of said plurality of non-common contents in a non-common content file;
   a generator of each of said plurality of web pages comprising a web site location identifier and a parameter;
   said parameter identifies at least one of said plurality of non-common contents and a location in said common content file associated with said parameter;
   said generator combines at least one particular one of said plurality of non-common contents from said non-common content file with said common content from said common content file at said location in said common content file associated with said parameter forming a composite content in a composite content file permitting said system to display a web page corresponding to said composite content;
   wherein said system permits modification of all web pages comprising said common content of said website through modifying only said common content file to form a modified common content file when said modification relates to said common content, said common content file is combined by said generator with said at least one particular one of said plurality of non-common contents from said non-common content file at said location in said modified common content file associated with said parameter forming a modified composite content in a modified composite content file permitting said system to display all web pages corresponding to said modified composite content from only one modified common content file corresponding to said modified common content.

2. A system according to claim 1 wherein said common content comprises an insertion location, and wherein said generator combines said at least one particular one of said plurality of non-common contents into said common content at said insertion location forming said composite content.

3. A system according to claim 2 wherein said common content comprises a plurality of insertion locations, said non-common content is insertable at each of said plurality of insertion locations and is selected from the group consisting of the same content, different content and combinations thereof.

4. A system according to claim 2 wherein at least one of said plurality of
   non-common contents comprise a sub-non-common content insertion location and wherein said sub-non-common content is insertable at said sub-non-common content insertion location, said sub-non-common content is selected from the group consisting of the same content, different content and combinations thereof, and said sub-non-common content is selected from the group consisting of being the same as said non-common content, being different from said non-common content and combinations thereof.

5. A system according to claim 2 wherein said common content comprises a plurality of insertion locations and wherein at least one of said plurality of non-common content comprises a sub-non-common content insertion location.

6. A system according to claim 5 wherein said non-common content comprises a plurality of insertion locations.

7. A system according to claim 5 wherein said non-common content is insertable at each of said plurality of insertion locations and at said sub-non-common content insertion location and is selected from the group consisting of the same content, different content and combinations thereof.

8. A system according to claim 2 further including an inserter at said insertion location.

9. A system according to claim 1 wherein at least one of said non-common content comprises an insertion location, and wherein said generator combines said common content into said at least one particular one of said plurality of non-common contents at said insertion location forming said composite content.

10. A system according to claim 9 wherein said non-common content comprises a plurality of insertion locations, said common content is insertable at each of said plurality of insertion locations and is selected from the group consisting of the same content, different content and combinations thereof.

11. A system according to claim 9 further including an inserter at said insertion location.

12. A system according to claim 1 wherein said web site further includes web pages not containing said common content.

13. A system according to claim 1 wherein at least one of said plurality of web pages comprises more than one of said plurality of non-common contents.

14. A system according claim 1 further including an index web page comprising a list of said parameters for displaying each of said plurality of web pages.

15. A system according to claim 14 wherein said parameters are selectable from said index web page for displaying each of said plurality of web pages.

16. A system according to claim 1 wherein said common content and said non-common content is selected from the group consisting of text and images.

17. A system according to claim 1 further including a plurality of classes of web pages.

18. A system according to claim 17 wherein each of said plurality of classes comprises a common class content and a non-common class content.

19. A system according to claim 18 wherein said non-common class content is
   selected from the group consisting of being the same between said plurality of classes, different between said plurality of classes and combinations thereof.

20. A system according to claim 1 wherein at least one of said plurality of non-common contents comprises a non-common content insertion location.

21. A system according to claim 1 further including a pull down menu listing said parameters.

22. A system according to claim 1 further including a plurality of icons corresponding to said parameters.

23. A method for organizing a web site comprising:
   providing a plurality of web pages wherein each of said plurality of web pages comprises common content and non-common content, there being a plurality of non-common content, each of said plurality of web pages comprises said common content and each of said plurality of web pages comprises at least one of said plurality of non-common contents;
   storing said common content in a common content storage location in a common content file;
   storing each of said plurality of non-common contents in a plurality of non-common content storage locations, each of said plurality of non-common contents storage locations being a non-common content file;
   generating each of said plurality of web pages using a web site location identifier and a parameter;
   said parameter identifies at least one of said plurality of non-common contents in said non-common content files and a location in said common content file associated with said parameter;
   said generating combines at least one particular one of said plurality of non-common contents from said non-common content files with said common content from said common content file at said location in said common content file associated with said parameter forming a composite content in a composite content file permitting displaying a web page corresponding to said composite content;
   wherein said method permits modification of all web pages comprising said common content of said website through modifying only said common content file to form a modified common content file when said modification relates to said common content, said common content file is combined by said generator with said at least one particular one of said plurality of non-common contents from said non-common content file at said location in said modified common content file associated with said parameter forming a modified composite content in a modified composite content file permitting said system to display all web pages corresponding to said modified composite content from only one modified common content file corresponding to said modified common content.

24. An article of manufacture comprising a computer program product comprising a non-transitory computer usable medium having computer readable program code comprising a method for organizing a web site, comprising:

providing a plurality of web pages wherein each of said plurality of web pages comprises common content and non-common content, there being a plurality of non-common contents, each of said plurality of web pages comprises said common content and each of said plurality of web pages comprises at least one of said plurality of non-common contents;

storing said common content in a common content storage location comprising a common content file;

storing each of said plurality of non-common contents in a plurality of non-common content storage locations comprising a plurality of non-common content files;

generating each of said plurality of web pages using a web site location identifier and a parameter;

said parameter identifies at least one of said plurality of non-common contents and a location in said common content file associated with said parameter;

said generating combines at least one particular one of said plurality of non-common contents with said common content at said location in said common content file associated with said parameter forming a composite content in a composite content file permitting displaying a web page corresponding to said composite content;

wherein said method permits modification of all web pages comprising said common content of said website through modifying only said common content file to form a modified common content file when said modification relates to said common content said common content file is combined by said generator with said at least one particular one of said plurality of non-common contents from said non-common content file at said location in said modified common content file associated with said parameter forming a modified composite content in a modified composite content file permitting said system to display all web pages corresponding to said modified composite content from only one modified common content file corresponding to said modified common content.

* * * * *